United States Patent [19]

Bruton

[11] Patent Number: 4,505,291
[45] Date of Patent: Mar. 19, 1985

[54] HEAT SENSITIVE FIRE SAFE VALVE ENERGY ASSIST DEVICE

[75] Inventor: Billy R. Bruton, Longview, Tex.

[73] Assignee: Axelson, Inc., Longview, Tex.

[21] Appl. No.: 522,335

[22] Filed: Aug. 11, 1983

[51] Int. Cl.³ .............................................. F16K 17/40
[52] U.S. Cl. ...................................... 137/77; 251/268
[58] Field of Search ..................... 137/77, 75, 76, 72, 137/73, 74; 251/268, 269

[56] References Cited

U.S. PATENT DOCUMENTS 3,916,930 11/1975 Erickson ................................ 137/76
4,421,134 12/1983 Bruton et al. ........................... 137/77

Primary Examiner—Alan Cohan
Attorney, Agent, or Firm—Hubbard, Thurman, Turner & Tucker

[57] ABSTRACT

Disclosed is a heat sensitive fire-safe valve energy assist device. The device includes a cup that is mountable exterior of the valve body to transmit forces thereto. The device also includes a pusher that is mountable about the valve stem to transmit force thereto. A spring or the like is provided for urging the cup and pusher axially apart, thereby to apply outwardly directed forces between the stem and the valve body. A fusible element is provided for releasably interlocking the pusher and cup at normal operating temperatures, but for allowing the pusher and cup to move with respect to each other when temperatures exceed a preselected level. The movement of the pusher with respect to the cup is limited, thereby to reduce the risk of injury to operating personnel.

20 Claims, 4 Drawing Figures

HEAT SENSITIVE FIRE SAFE VALVE ENERGY ASSIST DEVICE

BACKGROUND OF THE INVENTION

A. Field of the Invention

The present invention relates generally to valves, and more particularly to valves which in normal operation can be moved between open and closed positions, but which, when exposed to a selected high temperature level, will automatically be moved to a selected one of the open or closed positions and to an energy storing assist device for aiding in said movement.

B. Description of the Prior Art

In many instances, it would be desirable to utilize a valve which, under normal circumstances, could be readily opened and closed to perform its normal valving function, but upon exposure of such valve to excessively high temperatures, as for example, temperatures developed in fires, the valve would actuate fully to a selected one of its open or closed positions. For example, such a valve could be used in refineries, chemical plants and the like as well as in Christmas trees and flow lines in producing oil and gas wells to be automatically closed in the event of a fire as a safety precaution and to prevent the fluid normally flowing through such valve from further feeding the fire. Such heat sensitive valves would thus "fail" to the closed position. On the other hand, there may be instances where it would be desired for the valve to "fail" to the open position in the event of a fire. For example, it might be desirable to vent fluid to a flare in the event of a fire. As indicated, with either type of valve, it would be desirable to be able to utilize the valve as a normal valve during day-to-day operations in the sense that the valve could be readily opened and closed at will.

In co-pending U.S. patent application Ser. No. 416,686, filed Sept. 10, 1982, which is now U.S. Pat. No. 4,421,134 there is disclosed a heat sensitive gate valve, which under normal conditions, operates as a manual valve by rotation of a handwheel. The valve includes a fusible element, which when exposed to excessive heat as in a fire, allows valve body pressure acting on the valve stem to force the stem and gate to the closed position. The valve of U.S. Pat. No. 4,421,134 is thus well adapted to meet the needs described above. However, if valve body pressure is less than a certain amount, the force generated by such pressure may not be sufficient to close the valve. In such circumstances, even after melting of the fusible element, fluid flow would continue at low pressures.

Accordingly, it is an object of the present invention to provide means for moving a fire-safe valve to the "fail" position irrespective of valve body pressure.

It is a further object of the present invention to provide a device which stores and retains a predetermined amount of energy sufficient to operate a fire safe valve.

It is a further object of the present invention to provide an energy storing and retaining device that is a compact unit that can be included on a new valve or installed readily on a preexisting valve.

It is a further object of the present invention to provide an energy storing device that releases energy to do work when exposed to a predetermined high temperature.

It is a further object of the present invention to provide an energy storing device that has a limited stroke, but has sufficient available energy throughout its entire stroke to completely operate the fire-safe valve after release, but which prevents danger to service personnel.

SUMMARY OF THE INVENTION

Briefly stated, the foregoing and other objects are accomplished by the valve and energy assist device of the present invention. The energy assist device includes a generally cylindrical cup that is mounted exterior of the valve body about the bonnet and valve stem. The cup includes an inwardly extending shoulder which is adapted to transmit force to the exterior of the valve body. The device includes a pusher element that is mounted about the stem and which is adapted to transmit force to the stem. The pusher is axially movable with respect to the cup.

The device includes compression spring means disposed between the cup and pusher and adapted to apply axially outward forces therebetween. The pusher and cup are normally releasably interlocked together to preload the compression spring means with sufficient energy to move the stem to its fully outward position irrespective of valve body pressure. Such releasable interlocking is accomplished by a fusible element which has sufficient strength to maintain the interlock and preload during normal temperatures, but which, when subjected to predetermined high temperatures, melts or otherwise fails to allow the compression spring to force the pusher outwardly.

The device includes means for limiting the outward movement of the pusher with respect to the cup after the fusible element has melted. The movement limiting means allows the pusher to move far enough to operate the valve stem to the fully outward position. However, it is contemplated at such fully outward position, the compression spring means would still be loaded with sufficient force to move the valve. Thus, the movement limiting means retains such loading and thereby prevents danger to operating personnel when the valve is disassembled.

DESCRIPTION OF THE PREFERRED EMBODIMENT

Figure 1:
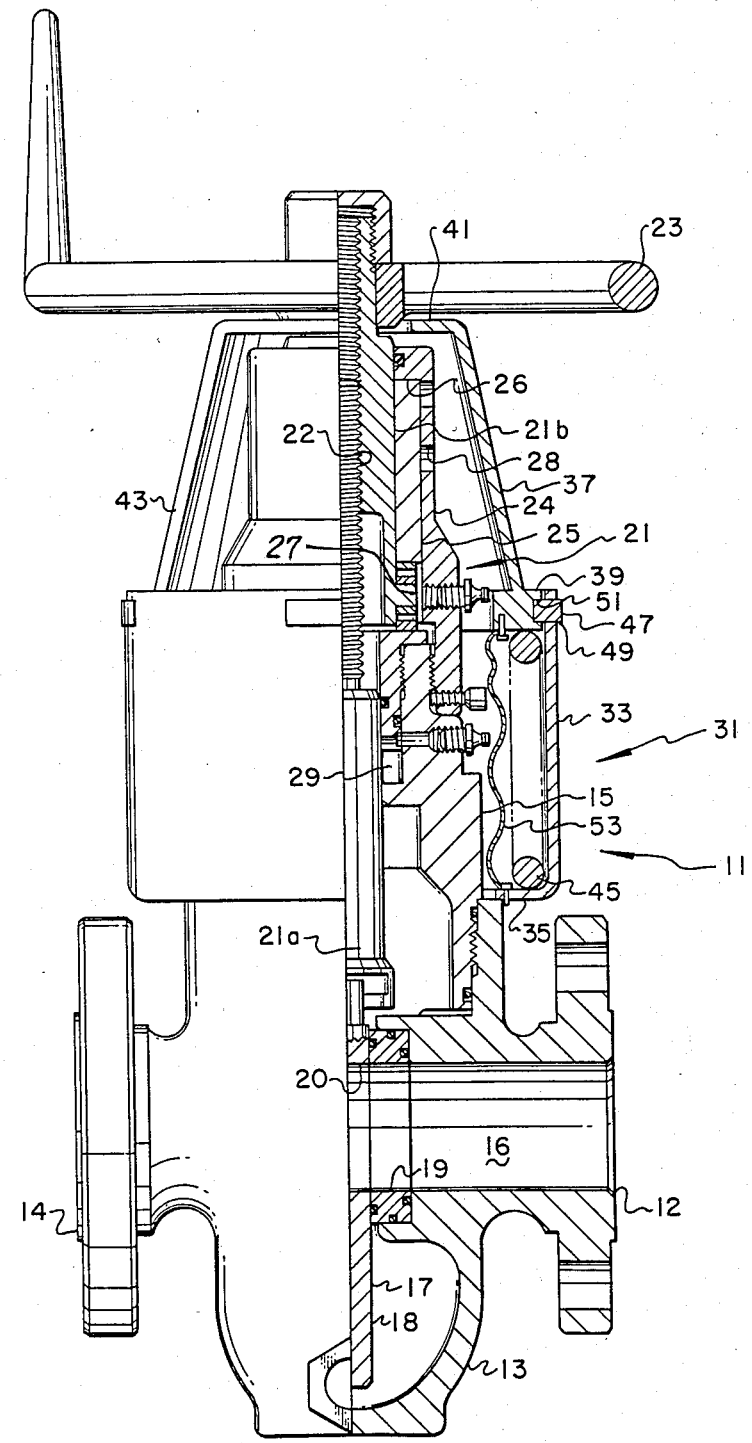
FIG. 1 is a quarter sectional view of a preferred embodiment of the fire-safe valve and energy assist device of the present invention.
Figure 2:
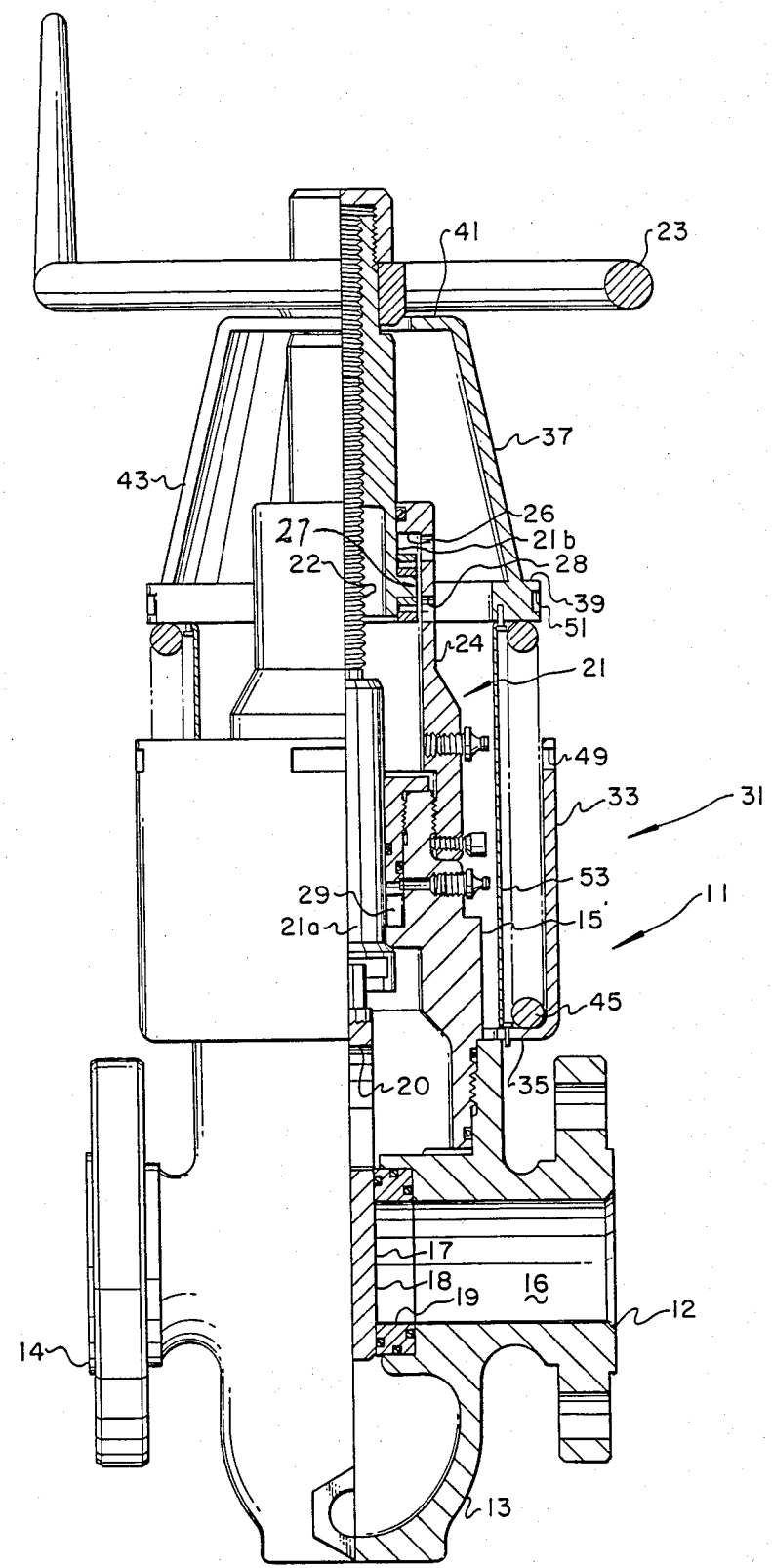
FIG. 2 is a quarter sectional view of the fire safe valve and energy assist device of FIG. 1 in the failed closed position.

Referring now to the drawings, and first to FIGS. 1 and 2, a heat sensitive fire-safe manual gate valve is designated generally by the numeral 11. Valve 11 is of the type disclosed in co-pending Application Ser. No. 416,686, filed Sept. 10, 1982, U.S. Pat. No. 4,421,134 which is incorporated by reference herein. Valve 11 includes generally a body 13, bonnet 15, gate valve element 17, and seats 19 (only one of which is shown).

More particularly, valve body 13 includes an inlet 12 and an outlet 14 with a flowway 16 therebetween. Valve 11 is adapted for connection in a fluid flow conduit at inlet 12 and outlet 14 by means of flanges or the like. Those skilled in the art will recognize that the functions of inlet 12 and outlet 14 may be reversed, i.e., valve 11 may be adapted for bidirectional flow.

Gate 17 includes an imperforate portion 18 and a port 20. In FIG. 1, valve 11 is shown in the open position, wherein port 20 of gate valve element 17 is positioned to coincide with flowway 16. As is well known, when valve 11 is closed, imperforate portion 18 of gate 17 is sealingly interposed between seats 19, thereby to close flowway 16.

Valve 11 includes actuating means for moving gate valve element 17 back and forth between the open and closed positions. The actuator means includes generally a stem 21 that is connected to gate valve element 17 and axially movable with respect to bonnet 15. Stem 21 includes a lower portion 21a and an upper portion 21b. Lower portion 21a and upper portion 21b are threadedly engaged with each other at 22. As will be described in greater detail, upper portion 21b is normally fixed against axial movement with respect to valve body 13, but is rotatable by means of a handwheel 23. Rotation of handwheel 23 acts through threaded interconnection 22 to cause lower portion 21a of stem 21 to move axially with respect to upper portion 21b, thereby to move gate valve element 19 back and forth between the open and closed positions.

Upper portion 21b of stem 21 is held in the position shown in FIG. 1 by means of the combination of a cap 24 and a fusible element 25. Cap 24 is connected to bonnet 15 and includes a radially inwardly extending shoulder 26. Upper portion 21b of stem 21 includes a radially outwardly extending shoulder 27 which axially opposes shoulder 26 of cap 24. Fusible element 25 is a cylinder of heat fusible material disposed about upper portion 21b of stem 21 and within cap 24 between opposed shoulders 26 and 27. Fusible element 25 has sufficient mechanical strength at normal operating temperatures to hold shoulders 26 and 27 in axially spaced apart relationship, as shown in FIG. 1. However, when valve 11 is exposed to high temperatures that exceed a preselected level, fusible element 25 melts, thereby allowing shoulders 26 and 27 to move toward each other, as is shown in FIG. 2. At least one port 28 is provided in cap 24 to allow the melted fusible material to flow or extrude out of cap 24.

In general, fusible element 25 can be made from materials which have physical properties suitable for undergoing the stresses and strains inherent to the normal operation of the valve. In addition, such materials should have a softening or melting point which will permit the valve to be closed when the temperature in the vicinity of the valve reaches a level selected by the designer of the valve. Ordinarily, this level will be a temperature within the range of 300° to 400° F. for ambient service of the valve but can be higher and lower. An example of a preferred one of such materials is an acetal resin marketed under the trademark DELRIN. Other materials which can be used are nylon-6/6, which is marketed under the name ZYTEL, a polycarbonate marketed under the name LEXAN, and TEXIN, which is a polyurethane. Also, there is a family of low melting point metal alloys that can be used, including 30/70 bar solder woods metal, etc.

As is set forth in detail in U.S. Pat. No. 4,421,134, when valve 11 is in its normal open position, as shown in FIG. 1, and is exposed to fire, fusible element 25 melts. As fusible element 25 melts, it loses its compressive strength and allows shoulder 27 to move toward shoulder 26. Such movement necessarily allows stem 21 to move outwardly and close valve 11, as shown in FIG. 2. The melted material of fusible element 25 is extruded out ports 28.

It is contemplated that in most instances, pressure within valve body 13 acting on lower stem 21a, which is slidingly sealingly engaged at 29 with bonnet 15, would be sufficient to force stem 21 fully outwardly upon melting of fusible element 25. However, in some services and under some conditions, valve body pressure is insufficient to perform such function. Accordingly, in the present invention, there is provided an energy assist device, which is designated generally by the numeral 31.

Energy assist device 31 includes a generally cylindrical cup 33. Cup 33 includes a radially inwardly extending shoulder 35 which is adapted to abut with and transmit force to valve body 13.

Energy assist device 31 further includes a pusher element 37. Pusher element 37 includes a circular flange 39 which is normally matingly received in cup 33, and a ring 41, which is connected to flange 39 by a pair of legs 43. Ring 41 is adapted to transmit forces to stem 21, preferably by abutting with handwheel 23.

Energy assist device 31 includes compression spring means for storing energy and for urging cup 33 and pusher 37 axially apart. Preferably, the compression spring means includes a coil spring 45 disposed within cup 33 between shoulder 35 and flange 39. However, those skilled in the art will recognize that the compression spring means may comprise or consist of a copressed gas cylinder, an expanding solid, or the like. Spring 45 is selected to provide sufficient energy and force to move stem 21 to its fully outward position with respect to bonnet 15 irrespective of valve body forces.

Spring 45 is normally compressed and preloaded by heat releasable means for interlocking the cup and pusher element together. In the embodiment of FIGS. 1 and 2, the heat releasable means includes a plurality of fusible elements 47. Fusible elements 47 are carried in a plurality of slots 49 positioned circumferentially about cup 33 and within a groove 51 formed circumferentially about flange 39. Fusible elements 47 are formed from material of the same class as that of fusible element 25 and are selected to be of such number and of sufficient strength to interlock cup 33 and pusher 37 under normal temperature conditions against the load of spring 45. When fusible elements 47 are subjected to temperatures above a predetermined level, they will melt or shear to allow pusher element 37 to move outwardly and deliver the energy stored in spring 45 to stem 21, as shown in FIG. 2.

Spring 45 is preferably selected so as to provide sufficient force throughout its stroke to move stem 21 to its fully outward position. Thus, after fusible elements 47 have released the interconnection between cup 33 and pusher element 37 and stem 21 has moved fully outwardly, spring 45 may still have substantial energy stored therein. Such stored energy would make the removal of handwheel 23 a dangerous undertaking. Accordingly, means are provided for limiting the axial movement between pusher element 37 and cup 33. In the embodiment of FIGS. 1 and 2, the axial movement limiting means includes at least one cable 53 connected between shoulder 35 of cup 33 and flange 39 of pusher element 37. Cable 53 has a length such that it is normally slack when cup 33 and pusher element 37 are interlocked, but becomes taught to restrain pusher element 37 with respect to cup 33 after pusher element has moved axially far enough to close valve 11.

Energy assist device 31 may be installed readily upon new valves in the shop or factory or upon existing valves in the field. Such installation is accomplished simply by removing handwheel 23 from upper portion 21b of stem 21 and positioning energy assist device 31 generally as shown in FIG. 1. With energy assist device so positioned, installation is completed by replacing handwheel 23.

Figure 3:
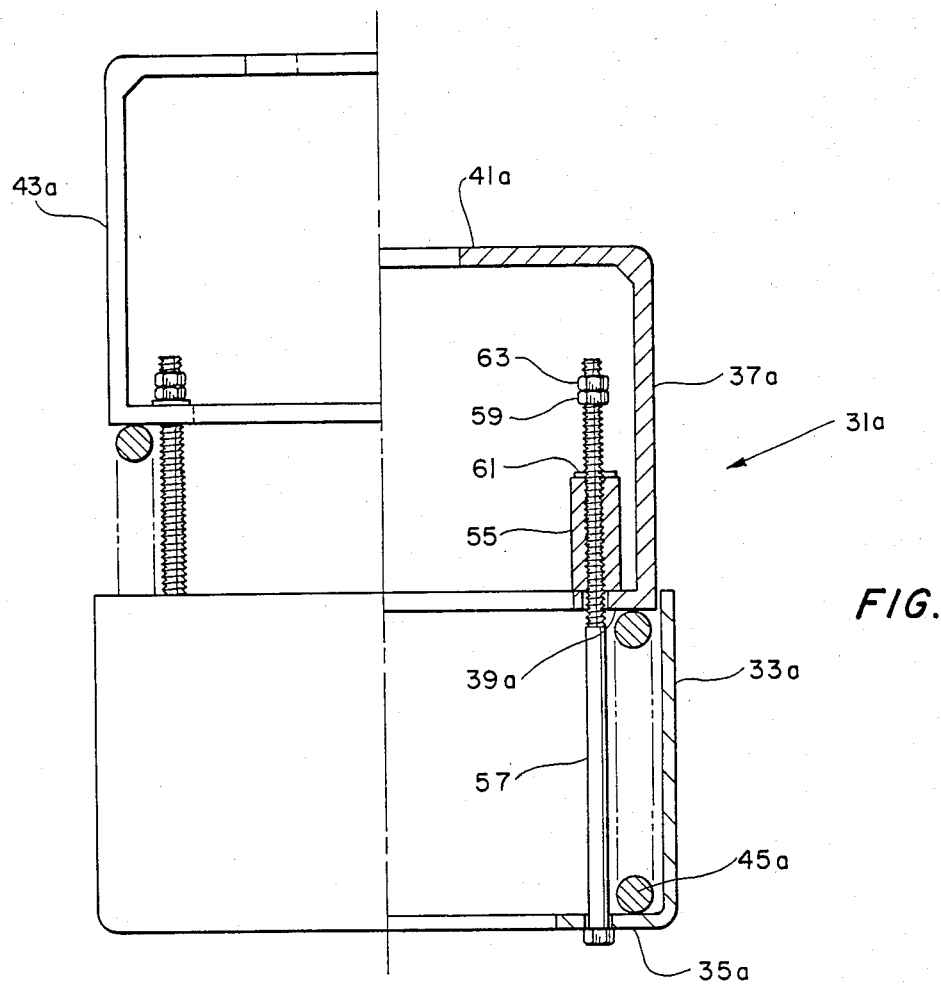
FIG. 3 is a quarter sectional view of an alternative embodiment of the energy assist device of the present invention.
Figure 4:
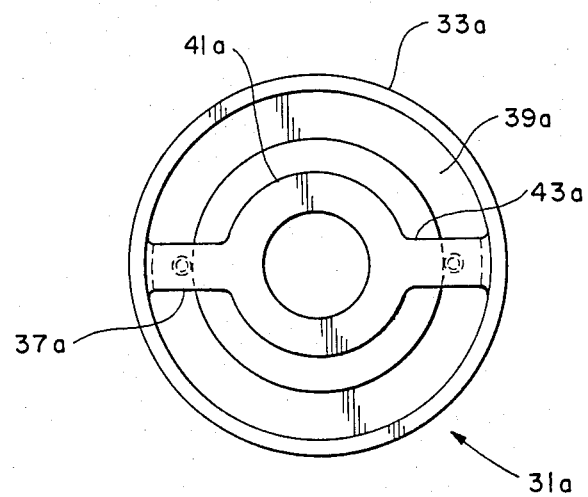
FIG. 4 is a top view of the energy assist device of FIG. 3.

Referring now to FIGS. 3 and 4, there is shown an alternative embodiment of the energy assist device of the present invention, which is designated generally by the numeral 31a. Device 31a includes a cup 33a and a pusher element 37a. Cup 33a includes a radially inwardly extending shoulder 35a and pusher element 37a includes a radially inwardly extending flange 39a. Pusher element 37a includes a ring 41a, which is connected to flange 39a by legs 43a. A coil spring 45a is disposed within cup 33a between shoulder 35a and flange 39a.

Cup 33a and pusher element 37a are normally releasably interlocked by means of a fusible element 55 that is, under normal temperature conditions, axially immovably connected to a rod 57. Rod 57 conveniently takes the form of a long bolt to which fusible element 55 is threadedly engaged. Fusible element 55 is chosen to have sufficient strength and threaded length so as to axially immovably oppose spring 45 under normal temperature conditions. However, under high temperature conditions, fusible element 55 shears and/or melts to allow spring 45a to urge pusher element 37a and cup 33a axially apart.

Axial movement of pusher element 37a with respect to cup 33 is limited by a stop nut 59 threadedly engaged with rod or bolt 57. A washer 61 may be carried by rod or bolt 57 and a lock nut 63 may be included. When fusible element 55 melts, pusher element 37a may move outwardly until restrained, as shown on the left hand side of FIG. 3.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompany drawings is to be interpreted as illustrative and not in a limiting sense.

What is claimed is:

1. For use with a fire-safe valve which includes a valve body having a fluid inlet and a fluid outlet with a flowway therebetween, a valving member mounted in said valve body for movement between an open position to allow flow through said flowway and a closed position to prevent flow through said flowway, a stem extending outwardly of said body and operable to move said valving member between said open and closed positions, and heat fusible means for maintaining said stem in a first inward position with respect to said valve body when the temperature around said valve body is less than a predetermined temperature and for allowing said stem to move to a second outward position with respect to said valve body when the temperature around said valve body is greater than said predetermined temperature, apparatus for applying outwardly directed forces between said stem and valve body, which comprises:

a cup mountable exterior of said valve body about said stem and including means for transmitting force to the outside of said valve body;

a pusher mountable about said stem and including means for transmitting force to said stem;

heat releasable means for interlocking said cup and said pusher to prevent axial movement therebetween when the temperature thereabout is less than said predetermined temperature and for allowing axial movement between said cup and pusher when the temperature thereabout is greater than said predetermined temperature;

and means for urging said cup and pusher axially apart.

2. The apparatus as claimed in claim 1 including means for limiting the axial movement of said pusher with respect to said cup after said heat releasable means has allowed said movement between said pusher and cup.

3. The apparatus as claimed in claim 2, wherein said axial movement limiting means includes a cable connected between said pusher and said cup.

4. The apparatus as claimed in claim 3, wherein the ends of said cable are fixed to said pusher and cup and said cable is slack when said pusher and cup are interlocked together.

5. The apparatus as claimed in claim 2, wherein said axial movement limiting means includes:

a rod connected to said cup and extending through said pusher;

and stop means for limiting movement of said pusher with respect to said rod.

6. The apparatus as claimed in claim 5, wherein said heat releasable means includes a fusible element axially immovably connected to said rod.

7. The apparatus as claimed in claim 2, wherein said axial movement limiting means allows said pusher to move axially with respect to said cup a distance at least as great as the distance between said first and second positions of said stem.

8. The apparatus as claimed in claim 1, wherein said means for urging said cup and pusher axially apart includes a compression spring disposed in force transmitting relation between said pusher and cup.

9. The apparatus as claimed in claim 1, wherein:

said cup includes a cylindrical element having an inwardly extending shoulder defining said means for transmitting force to the outside of said valve body;

said pusher includes a flange insertable in said cylindrical element of said cup, said pusher including a leg extending outwardly from said flange and having a ring connected thereto, said ring being mountable about said stem and defining said means for transmitting force to said stem;

and said means for urging said pusher and cup axially apart including a compression spring disposed within said cup between said shoulder and flange.

10. The apparatus as claimed in claim 9, wherein said heat releasable means includes recesses formed in said cup and flange and a fusible element inserted in said recesses.

11. A fire-safe valve, which comprises:

a valve body having a fluid inlet and a fluid outlet with a flowway therebetween;

a valving member mounted in said valve body for movement between an open position to allow flow through said flowway and a closed position to prevent flow through said flowway;

a stem extending outwardly of said body and operable to move said valving member between said open and closed positions;

heat fusible means for maintaining said stem in a first inward position with respect to said valve body when the temperature around said valve body is less than a predetermined temperature and for allowing said stem to move to a second outward position with respect to said valve body when the temperature around said valve body is greater than said predetermined temperature;

a cup mounted exterior of said valve body about said stem and including means for transmitting force to the outside of said valve body;

a pusher mounted about said stem and including means for transmitting force to said stem;

heat releasable means for interlocking said cup and said pusher to prevent axial movement therebetween when the temperature around said valve body is less than said predetermined temperature and for allowing axial movement between said cup and pusher when the temperature around said body is greater than said predetermined temperature;

and means for urging said cup and pusher axially apart.

12. The fire-safe valve as claimed in claim 11, including means for limiting the axial movement of said pusher with respect to said cup after said heat releasable means has allowed said movement between said pusher and cup.

13. The fire-safe valve as claimed in claim 12, wherein said axial movement limiting means includes a cable connected between said pusher and said cup.

14. The fire-safe valve as claimed in claim 3, wherein the ends of said cable are fixed to said pusher and cup and said cable is slack when said pusher and cup are interlocked together.

15. The fire-safe valve as claimed in claim 12, wherein said axial movement limiting means includes:
a rod connected to said cup and extending through said pusher
and stop means for limiting movement of said pusher with respect to said rod.

16. The fire-safe valve as claimed in claim 15, wherein said heat releasable means includes a fusible element axially immovably connected to said rod.

17. The fire-safe valve as claimed in claim 12, wherein said axial movement limiting means allows said pusher to move axially with respect to said cup a distance at least as great as the distance between said first and second positions of said stem.

18. The fire-safe valve as claimed in claim 12, wherein said stem includes a handwheel removably connected thereto and said means for transmitting force to said stem includes an annular shoulder connected to said pusher and abuttable with said handwheel.

19. The fire-safe valve as claimed in claim 18, wherein said axial movement limiting means retains said pusher about said stem when said handwheel is removed.

20. The fire-safe valve as claimed in claim 11, wherein said means for urging said cup and pusher axially apart includes a compression spring disposed in force transmitting relation between said pusher and cup.

* * * * *